3,124,615
CAROTENOID COMPOUNDS
Basil Charles Leicester Weedon, London, and Charles Kenneth Warren, Barking, England, assignors to National Research Development Corporation
No Drawing. Filed Mar. 23, 1959, Ser. No. 800,903
Claims priority, application Great Britain Mar. 24, 1958
4 Claims. (Cl. 260—586)

The present invention relates to keto-alkylidene alkapolyenes and has as an object the provision of new keto-alkylidene alkapolyenes and methods for the preparation thereof. The invention has as a further object the provision of a method for the preparation of carotenoid compounds from the new keto-alkylidene alkapolyenes.

By the present invention there are provided new keto-alkylidene alkapolyenes of the general formula

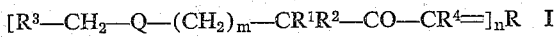
[R³—CH₂—Q—(CH₂)ₘ—CR¹R²—CO—CR⁴=]ₙR    I in which
R¹ and R² represent alkyl groups each of which contains from 1 to 4 carbon atoms and both of which are preferably methyl groups,
Q represents a carbonyl group, a hydroxymethylene group, an acyloxymethylene group such as an acetyloxymethylene, propionyloxymethylene or benzoyloxy methylene group, or a ketalised carbonyl group such as an ethylenedioxymethylene, dimethoxy methylene or diethoxymethylene group,
R represents the hydrocarbon residue of the conjugated polyenic mono- or di-aldehyde and may have one or more of its ethylenic linkages replaced by an acetylenic linkage,
R³ represents an alkyl group or a hydrogen atom,
R⁴ represents an alkyl group or a hydrogen atom,
m represents 1 or 2, and
n represents 1 or 2 according to whether the said hydrocarbon residue is the residue of a mono- or di-aldehyde respectively.

The new keto-alkylidene alkapolyenes of the general Formula I in which Q is other than a carbonyl group may be prepared by a method provided in accordance with the present invention, which comprises condensing a ketone of the general formula

R³—CH₂—Q¹—(CH₂)ₘ—CR¹R²—CO—CH₂R⁴    II in which Q¹ represents a hydroxymethylene, acyloxymethylene or ketalised carbonyl group with a polyenic mono- or di-aldehyde, by heating them together with an alkaline condensing agent, for example alcoholic alkali. The product may then be converted to a keto-alkylidene alkapolyene of the general Formula I in which Q represents a carbonyl group by:

(a) where Q¹ is a hydroxymethylene group-oxidation, for example using chromic acid or acetone and aluminum tert-butoxide,
(b) where Q¹ is an acyloxymethylene group-hydrolysis, for example in the presence of an alkali metal hydroxide, to convert it to a hydroxymethylene group which can then be oxidised as in (a),
(c) where Q¹ is a ketalised carbonyl group-hydrolysis, in the presence for example of p-toluene sulphonic acid in solution in acetone.

Suitable polyenic monoaldehyde starting materials for use in the process of the present invention are for example 17-[2′,6′,6-trimethyl-cyclohexen-(1′)-yl]-2,6,11,15-tetramethyl-heptadecacotaen-(2,4,6,8,10,12,14,16)-al-(1) (which may be termed apo-2-carotinal) and 17-[2′,6′,6′-trimethyl-cyclohexen-(1′)-yl]-2,6,11,15-tetramethyl-heptadecaheptaen-(2,4,6,10,12,14,16)-in-(8)-al-(1) (which may be termed dehydro-apo-2-carotinal). Suitable polyenic dialdehydes for use in the process are, for example 2,6,11,15-tetramethyl-hexadecaheptaen-(2,4,6,8,10,12,14)-dial-(1,16) (crocetin dialdehyde),
2,6,11,15-tetramethyl-hexadecahexaen-(2,4,6,10,12,14)-in-(8)dial-(1,16) (dehydro-crocetin dialdehyde)
2,7-dimethyl-octatrien-(2,4,6)-dial-(1,8) and
2,7-dimethyl-octadien-(2,6)-in-(4)-dial-(1,8).

The keto-alkylidene alkapolyenes of the general Formula I in which Q represents a carbonyl group are readily convertible, when $m=2$, to carotenoid compounds of the general formula

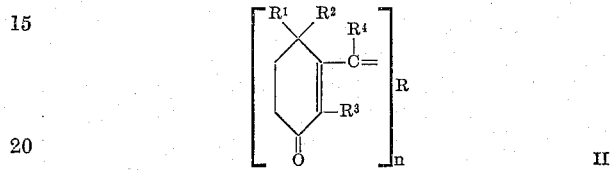

and where $m=1$ to carotenoid compounds of the general formula

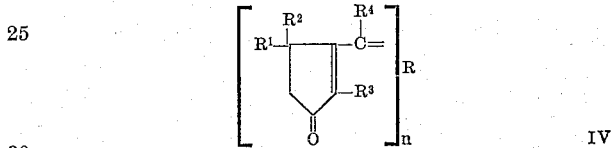

in which R, R¹, R², R³ and n are as hereinfore defined, by a method, provided in accordance with the present invention which comprises effecting cyclization by heating in solution (for example in a mixture of methanol and benzene) in the presence of an alkali metal hydroxide, preferably potassium hydroxide. Obviously any acetylenic linkage present in the aldehyde will be present in the carotenoid compound obtained. It may be converted to an ethylenic linkage by partial hydrogenation.

The carotenoids thus obtained are valuable colouring agents and may be used for colouring foodstuffs, animal feeds and cosmetic preparations. Those of the general Formula III in which R¹, R² and R³ represent methyl groups, R⁴ represents a hydrogen atom are preferred as they are identical with or similar to (depending upon the nature of the polyenic aldehyde) carotenoids which have been found to occur in nature.

The following examples are given in order to illustrate the invention.

*Example 1*

A solution of 160 g. of α,α-dimethyl-glutaric acid and 8 ml. of concentrated sulphuric acid in 2000 ml. of methanol was heated under reflux for 16 hours and then cooled. Excess solid sodium hydrogen carbonate was added and the methanol was distilled off. The residual oil was dissolved in 600 ml. of ether and the mixture was washed with water. After being dried over sodium sulphate, the solution was evaporated under reduced pressure and the residue distilled to give 120 g. of dimethyl α,α-dimethyl-glutarate; B.P.=117°–119° C./20 mm., $n_D{}^{23}=1.4281$.

A solution of 106 g. of the dimethyl α,α-dimethyl-glutarate and 35 g. of potassium hydroxide in 650 ml. of methanol was allowed to stand for 16 hours at 20° C. After being heated under reflux for 2 hours, the mixture was cooled and evaporated to dryness at reduced pressure. The solid residue was treated with the theoretical quantity of aqueous 2-N hydrochloric acid, and the liberated monoester was extracted with ether. After being washed with water, the ethereal extracts were dried over sodium sulphate and evaporated at reduced pressure. The residue was distilled to give an oil (B.P.=98°–99° C. 0.05 mm.

$n_D^{22} = 1.4391$) which readily crystallised. Recrystallisation from light petroleum (B.P. = 60°–80° C.) gave 76 g. of 2,2-dimethyl-glutaric acid 1-(methyl ester) as colourless needles; M.P. = 43.5°–45.0° C.

The 76 g. of the foregoing 2,2-dimethyl-glutaric acid monoester were dissolved in 120 ml. of thionyl chloride and allowed to stand for 3 days at 20° C. After removal of excess thionyl chloride at reduced pressure, the residual acid chloride in 300 ml. of benzene was slowly added to a well stirred solution of cadmium diethyl (from 100 g. of ethyl bromide) in 1 litre of benzene. When the addition was complete the reaction mixture was heated under reflux for 50 minutes, cooled and the complex decomposed with ice and 250 ml. of aqueous 2-N sulphuric acid. The benzene layer was separated and the aqueous phase was extracted with benzene. After being washed with saturated aqueous sodium hydrogen carbonate and water, the combined benzene solutions were dried over sodium sulphate and evaporated at reduced pressure. Distillation of the residue through a fractionating column (Stedman, 15 x 2 cm.) under a partial take-off head, gave 52 g. of methyl 2,2-dimethyl-5-keto-heptanoate; B.P. = 74° C./0.7 mm., $n_D^{21} = 1.4352$. The semicarbazone was prepared by allowing a solution of 200 mg. of the keto-ester, 300 mg. of semicarbazide hydrochloride and 0.5 g. of crystalline sodium acetate in 4 ml. of aqueous ethanol (1:1) to stand at 0° C. After a fortnight, some crystals were deposited. 2 ml. of water were added and the mixture was allowed to stand for 1 hour at 0° C. Recrystallisation of the product from aqueous methanol gave 240 mg. of the required semicarbazone as lustrous plates; M.P. = 123°–124° C.

A mixture of 42 g. of methyl 2,2-dimethyl-5-keto-heptanoate, 110 g. of 2-ethylenedioxy-butane and 0.2 g. of p-toluene-sulphonic acid was heated under reflux through a fractionating column (Stedman, 15 x 2 cm.) under a partial take-off head. At intervals, over 7 hours, small portions of the distillate were withdrawn until a total of 37 ml. was collected. After being cooled, the reaction mixture was washed with saturated aqueous sodium hydrogen carbonate and water, dried over sodium sulphate and distilled through the same fractionating column to give 32 g. of methyl 2,2-dimethyl-5-ethylene-dioxy-heptanoate; B.P. = 90°–92° C./1.0 mm., $n_D^{21} = 1.4438$.

32 g. of the methyl 2,2-dimethyl-5-ethylenedioxy-heptanoate, 28.0 ml. of aqueous 5-N sodium hydroxide and 35 ml. of methanol were heated under reflux together for 30 minutes. 22 ml. of water was added and the heating under reflux was continued for 60 minutes. After being cooled, the mixture was evaporated almost to dryness, 15 ml. of water was added and the evaporation repeated. A solution of the wet residue in 100 ml. of water was cooled to 0° C. and shaken with 250 ml. of ether whilst aqueous 2-N hydrochloric acid was added until the mixture was almost neutral. The organic layer was separated and the aqueous phase extracted with ether (3 times with 50 ml.). After being dried over magnesium sulphate, the combined ethereal solutions were evaporated at reduced pressure. Cold crystallisation of the residual oil from pentane containing a trace of ether gave 28 g. of 2,2-dimethyl-5-ethylenedioxy-heptanoic acid as colourless prisms; M.P. = 15°–17° C.

27 g. of 2,2-dimethyl-5-ethylenedioxy-heptanoic acid in 100 ml. of ether were slowly added to a vigorously stirred solution of 6.1 g. of lithium-methyl in 250 ml. of ether. After being heated under reflux for 90 minutes, the reaction mixture was cooled to 0° C. and treated with 100 ml. of water at 0° C. The organic layer was separated and the aqueous phase extracted 3 times with 50 ml. of ether. After being dried over magnesium sulphate, the combined ether solutions were evaporated at reduced pressure. Distillation of the residual oil gave 22 g. of 3,3-dimethyl-ethylenedioxy-octanone-(2); B.P. = 78°–84° C./0.5 mm., $n_D^{21} = 1.4508$.

A suspension of 253 mg. of crocetin dialdehyde in a mixture of 4.2 ml. of the 3,3-dimethyl-6-ethylenedioxy-octanone-(2) and 6.0 ml. of 5% ethanolic potassium hydroxide was kept at 20° C. and shaken occasionally for 250 minutes. The mixture was then heated under reflux for 15 minutes, cooled and diluted with 100 ml. of benzene. After being washed successively with water, 0.05 N sulphuric acid, saturated aqueous sodium hydrogen carbonate, and finally with water, the benzene solution was dried over sodium sulphate and evaporated at reduced pressure. The oily residue, consisting mainly of excess 3,3-dimethyl-6-ethylenedioxy-octanone-(2), was diluted with 40 ml. of light petroleum (B.P. = 60°–80° C.) and allowed to stand for 16 hours at 0° C. to give 362 mg. of deep-red leaflets; M.P. = 170°–172° C. Recrystallisation from benzene/petroleum (B.P. = 60–80° C.) gave 3,30-di (ethylenedioxy)-6,6,10,14,19,23,27,27-octamethyl - doctriacontanonaene - (8,10,12,14,16,18,20,22,24)-dione-(7,26) as deep-red leaflets; M.P. = 174° C.; visible light absorption maxima at 518 and 485 m$\mu$, $\epsilon \times 10^{-3} = 116$ and 128 respectively; infra-red absorption maximum at 1672 cm.$^{-1}$.

A solution of 310 mg. of the preceding 3,30-di(ethylenedioxy) - 6,6,10,14,19,23,27,27 - octamethyl - doctriacontanonaene - (8,10,12,14,16,18,20,22,24)-dione-(7,26) in 50 ml. of acetone containing 20 mg. of p-toluene-sulphonic acid was heated under reflux for 60 minutes and then cooled. The reaction mixture was diluted with 150 ml. of benzene, washed with saturated aqueous sodium hydrogen carbonate and water, and dried over sodium sulphate. Evaporation to dryness and crystallisation of the residue from benzene-petroleum (B.P. = 60°–80° C.) gave 174 mg. of 6,6,10,14,19,23,27,27-octamethyl-doctriacontanonaene-(8,10,12,14,16,18,20,22,24)-tetraone - (3,7,26,30) as deep-red plates; M.P. = 174° C.; visible light absorption maxima at 520 and 485 m$\mu$, $\epsilon \times 10^{-3} = 121$ and 130 respectively; infra-red absorption maxima at 1700 and 1668 cm.$^{-1}$. The mother liquors from the above crystallisations were evaporated to dryness and the residue dissolved in 25 ml. of acetone containing 10 mg. of p-toluene-sulphonic acid. After standing for 3 days at 0° C. the solution deposited deep-red crystals which were recrystallised from benzene-petroleum (B.P. = 60°–80° C.) to give a further 23 mg. of 6,6,10,14,19,23,27,27-octamethyl - doctriacontanonaene - (8,10,12,14,16,18,20,22,24) - tetraone - (3,7,26,30). Total yield = 197 mg. (72%).

A suspension of 100 mg. of the last named compound in 150 ml. of 10% methanolic potassium hydroxide, containing 20 ml. of benzene, was heated under reflux for 2 hours. A homogeneous solution was obtained after 30 minutes. After being cooled the reaction mixture was diluted with 250 ml. of benzene and washed successively with water, aqueous 2-N sulphuric acid, saturated aqueous sodium hydrogen carbonate and finally with water. The benzene solution was dried over sodium sulphate and evaporated to dryness. Purification of the residue by recrystallisation from benzene/petroleum or benzene/methanol (B.P. = 60°–80° C.) was unsuccessful, but chromatography from benzene solution on grade III alumina gave two red bands, A and B, which were developed and eluted with benzene. The solution of the more readily eluted A, was evaporated to dryness and the residue recrystallised from benzene/petroleum (B.P. = 60°–80° C. to give 23 mg. of canthaxanthin as red prisms; M.P. = 215° C.; visible light absorption maximum at 480 m$\mu$, $\epsilon \times 10^{-3} = 118$; infra-red absorption maximum at 1657 cm.$^{-1}$. The solution of band B above was evaporated to dryness and the residue recycled to give a further 8 mg. of canthaxanthin. Total yield = 31 mg. (33%).

Example 2

A suspension of 102 mg. of apo-2-carotinal in a mixture of 4.2 ml. of 3,3-dimethyl-6-ethylenedioxy-octanone-(2) and 4.2 ml. of 5% ethanolic potassium hydroxide was kept at 20° C., and shaken occasionally, for 380 minutes. The mixture was then heated under reflux for 15 minutes, cooled and diluted with 60 ml. of benzene. After being washed successively with water, aqueous 0.05-N sulphuric acid, saturated aqueous sodium hydrogen carbonate, and finally with water, the benzene solution was dried over sodium sulphate and evaporated at reduced pressure. The oily residue, consisting mainly of excess 3,3-dimethyl-6-ethylenedioxy-octanone-(2), was diluted with 40 ml. of light petroleum (B.P.=60°–80° C.) and allowed to stand at 0° C. for 16 hours. No crystallisation from the solution could be induced. After removal of the petroleum at 10 mm., the excess 3,3-dimethyl - 6 - ethylenedioxy-octane-(2) was distilled off at 60° C. (bath temperature)/$10^{-6}$ mm. Chromatography of the residue in light petroleum (B.P.=60°–80° C.) on grade III alumina, gave one main red band which was developed and eluted with benzene-petroleum (1:1). Evaporation of the resultant solution to dryness gave a glass-like residue which slowly crystallised from light petroleum (B.P.=60°–80° C.) to give 47.5 mg. of 3-ethylenedioxy-25-[2′,6′,6′-trimethyl-cyclohexen - (1′) - yl]-6,6,10,14,19,23-hexamethyl-pentacosanonaen - (8,10,12,14,16,18,20,22,24) - one - (7) as violet, flat needles; M.P.=124°–125° C.; visible light absorption maximum at 484 m$\mu$, $\epsilon \times 10^{-3}$=120; infra-red absorption maximum at 1670 cm.$^{-1}$.

A solution of 86 mg. of the last named substance in 50 ml. of acetone containing 10 mg. of p-toluene-sulphonic acid was allowed to stand for 16 hours at 20° C. After being heated under reflux for 30 minutes, the reaction mixture was cooled and diluted with 60 ml. of benzene. The resultant solution was washed successively with saturated aqueous sodium hydrogen carbonate and water and dried over sodium sulphate. Evaporation to dryness and crystallisation of the residue from methanol/petroleum gave 27 mg. of 25-[2′,6′,6′-trimethyl-cyclohexen - (1′)-yl] - 6,6,10,14,19,23 - hexamethyl-pentacosanonaene-(8,10,12,14,16,18,20,22,24) - dione - (3,7) as dull red prisms; M.P.=124° C.; visible light absorption maximum at 483 m$\mu$; $\epsilon \times 10^{-3}$=121; infra-red absorption maxima at 1709 and 1667 cm.$^{-1}$. The mother liquors from the crystallisations were evaporated to dryness and the residue dissolved in light petroleum (B.P.=60°–80° C.). Chromatography on alumina gave one main red band which was developed with benzene/petroleum (B.P.=60°–80° C.) and eluted with benzene. Evaporation of the resultant solution to dryness, and crystallisation of the residue from light petroleum, gave a further 10.5 mg. of 25-[2′,6′,6′-trimethyl-cyclohexen - (1′) _ yl] - 6,6,10,14,19,23 - hexamethyl-pentacosanonaene - (8,10,12,14,16,18,20,22,24)-dione-(3,7). Total yield=37 mg. (46%).

A solution of 28 mg. of the last named substance in 35 ml. of 10% methanolic potassium hydroxide containing 5 ml. of benzene was heated under reflux for 150 minutes. The product crystallised out from the hot reaction mixture as small violet plates (M.P.=186°–187° C.) which were recrystallised from benzene/methanol to give 23 mg. of echinenone as violet plates; M.P.=187° C.; visible light absorption maximum at 472 m$\mu$; $\epsilon \times 10^{-3}$=115; infra-red absorption maximum at 1656 cm.$^{-1}$. The product did not separate in a mixed chromatogram from the main carotenoid of the alga *Anabaena cylindrica*.

Example 3

A mixture of 2:9-dimethyldeca-2:4:6:8-tetraenedial (206 mg.), 6-ethylenedioxy - 3:3 - dimethyloctan-2-one (5.0 g.) and aluminium tert. butoxide (1.0 g.) in benzene (10 ml.) was heated under reflux for 20 hours. After being cooled, the reaction mixture was diluted with benzene (100 ml.) and washed successively with 0.05 N-sulphuric acid, saturated aqueous sodium hydrogen carbonate and water. The benzene solution was dried (Na$_2$SO$_4$) and evaporated. Excess 6-ethylenedioxy - 3:3 - dimethyl-octan - 2 - one was distilled off at 60° C. (bath temperature)/$10^{-6}$ mm. Chromatography of the residue in benzene on aluminium, isolation of the main yellow band, and crystallisation from benzene-light petroleum (B.P. 60–80° C.) gave 3:24 - di - (ethylenedioxy) - 6:6:10:17:21:-21-hexamethyl - hexacosa - 8:10:12:14:16:18 - hexaene-7:20-dione (162 mg.) as yellow needles, M.P. 143–146° C. Visible light absorption maxima: 449 and 424 m$\mu$; $\epsilon \times 10^{-3}$ 78.0 and 85.0 respectively. Infra-red absorption maximum at 1667 cm.$^{-1}$.

Example 4

A solution of the hexaene-dione prepared in the preceding example (136 mg.) in acetone (60 ml.) containing toluene - p - sulphonic acid (20 mg.) was refluxed for 90 min. After being cooled and diluted with benzene (100 ml.), the reaction mixture was washed with saturated aqueous sodium hydrogen carbonate and water, dried (Na$_2$SO$_4$) and evaporated. Recrystallisation of the residue from benzene-petroleum gave 6:6:10:17:21:21-hexamethylhexacosa - 8:10:12:14:16:18 - hexaene - 3:7:20:-24-tetraone (105 mg.) as yellow needles, M.P. 105–107°. Visible light absorption maxima: 450 and 423 m$\mu$; $\epsilon \times 10^{-3}$, 86.7 and 88.7 respectively. Infra-red absorption maxima at 1709 and 1668 cm.$^{-1}$.

Example 5

A solution of hexaene-tetrone prepared in Example 4 (36 mg.) in 10% methanolic potassium hydroxide (50 ml.) containing benzene (5 ml.) was refluxed for 2½ hours. After being cooled and diluted with benzene (100 ml.) the reaction mixture was washed successively with water, 0.5 N-sulphuric acid, saturated aqueous sodium hydrogen carbonate, and water. The benzene solution was dried (Na$_2$SO$_4$) and evaporated. Chromatography of the residue from benzene on alumina gave two bands, A and B, which were developed and eluted with benzene. The solution of the more readily eluted A, was evaporated and the residue was crystallised from petroleum, to give 1:12-di-(3′ keto-2′:6′:6′-trimethyl-cyclo-hex-1′-enyl) - 3:10 - dimethyldodeca - 1:3:5:7:9:11-hexaene (10.5 mg.) as orange-yellow needles, M.P. 203°. Visible light absorption maximum: 425 m$\mu$; $\epsilon \times 10^{-3}$, 70.5. Infrared absorption maximum at 1652 cm.$^{-1}$.

The solution of band B above, was evaporated and the residue recycled to give a further 3 mg. of the hexaene-dione. Total yield=13.5 mg. (40%).

Obviously various departures may be made from the specific procedures of the foregoing examples without departing from the ambit of the invention as defined in the appended claims, for example the polyenic aldehydes referred to in the examples may be replaced by others of the polyenic mono- and di-aldehydes recited hereinbefore.

We claim:
1. A keto-alkylidene alkapolyene of the general formula

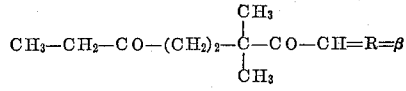

in which R is a conjugated polyenic carotenoid hydrocarbon chain and =$\beta$ is selected from the class consisting of groups of the formulae

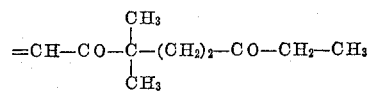

and
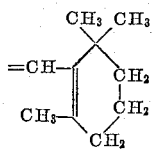
2. 6,6,10,14,19,23,27,27 - octamethyl - dotriacontanonaene-(8,10,12,14,16,18,20,22,24)-tetraone-(3,7,26,30).
3. 25 - [2',6',6' - trimethyl - cyclohexen - (1') - yl]-6,6,10,14,19,23 - hexamethylpentacosanonaene - (8,10,12,14,16,18,20,22,24)-dione-(3,7).
4. 6,6,10,17,21,21 - hexamethylhexacosa - 8,10,12,14,16,18-hexaene-3,7,20,24-tetraone.
References Cited in the file of this patent
UNITED STATES PATENTS
| | | |
|---|---|---|
| 2,387,587 | Hunsdiecker | Oct. 23, 1945 |
| 2,799,706 | Kimel et al. | July 16, 1957 |
| 2,815,379 | Surmatis | Dec. 3, 1957 |
| 2,816,117 | Cawley | Dec. 10, 1957 |
| 2,839,537 | Miescher et al. | June 17, 1958 |
| 2,849,491 | Surmatis | Aug. 26, 1958 |
| 2,870,210 | Surmatis | Jan. 20, 1959 |
OTHER REFERENCES
Karrer et al.: Carotenoids, pages 133, 139, 241 and 251 (1950).